United States Patent [19]

Jacques

[11] Patent Number: 4,848,925

[45] Date of Patent: Jul. 18, 1989

[54] METHOD AND DEVICE FOR TESTING OF TEMPERATURE CONTROL VALVES IN THE WATER COOLING SYSTEM OF LOCOMOTIVE ENGINES

[76] Inventor: Paul Jacques, Louvicourt, Quebec, Joy 1Y0, Canada

[21] Appl. No.: 160,325

[22] Filed: Feb. 25, 1988

Related U.S. Application Data

[63] Continuation-in-part of Ser. No. 807,759, Dec. 11, 1985, abandoned.

[30] Foreign Application Priority Data

Jan. 22, 1985 [CA] Canada .................................. 472535

[51] Int. Cl.⁴ ........................ G01K 15/00; G01K 1/14

[52] U.S. Cl. ........................................ 374/145; 374/1; 374/3

[58] Field of Search ....................... 374/1, 3, 144, 145; 123/41.15

[56] References Cited

U.S. PATENT DOCUMENTS

| | | | |
|---|---|---|---|
| 2,026,079 | 12/1935 | White et al. | 374/3 |
| 2,653,470 | 9/1953 | Couper | 374/1 |
| 2,729,095 | 1/1956 | Greer | 374/1 |
| 2,854,844 | 10/1958 | Howell | 374/1 |
| 3,067,604 | 12/1962 | Brunson | 374/1 |
| 3,347,085 | 10/1967 | Harris | 374/1 |
| 3,370,454 | 2/1968 | Flores | 374/3 |
| 3,557,565 | 1/1971 | Kissel | 374/1 |
| 3,757,207 | 9/1973 | Hire | 374/1 |
| 4,381,744 | 5/1983 | Terry | 123/41.15 |
| 4,702,620 | 10/1987 | Ford | 374/145 |

*Primary Examiner*—William A. Cuchlinski, Jr.

*Assistant Examiner*—Thomas B. Will

*Attorney, Agent, or Firm*—Sherman and Shalloway

[57] ABSTRACT

A portable device is provided herein for testing a plurality of thermostats in situ, each thermostat being connected to an associated one of heat sensing units which are located within a liquid coolant circulation system of a manifold of a locomotive engin. The portable device includes a double-open-ended tubular casing fitted with an electric heater, whereby liquid coolant may be heated while it flows through the tubular casing. A first conduit is connected to one open, outflow, end of the tubular casing, the first conduit being provided with a pressure safety valve, the first conduit being connectable to a liquid coolant inflow line leading from a main liquid coolant reservoir, for conducting liquid coolant liquid to the manifold. The first conduit is provided with a first portion of a first, quick-connect coupling. A second conduit is connected to one inflow open end of the tubular casing, the second conduit being provided with a temperature gauge, and with a first portion of a second quick-connect coupling. Finally, a hose is connected to the second conduit by means of a second portion of the second quick-connect coupling. That hose is connectable to a liquid coolant outflow line for conducting liquid coolant from the manifold of a locomotive engine. Thus, a device is provided which may be disposed in the coolant liquid circulation system of the locomotive engine to provide a circulating flow of a confined, small amount of electrically-heated liquid coolant between the manifold and the portable device, to test the accuracy and operability of the plurality of thermostats.

11 Claims, 2 Drawing Sheets

FIG. 2
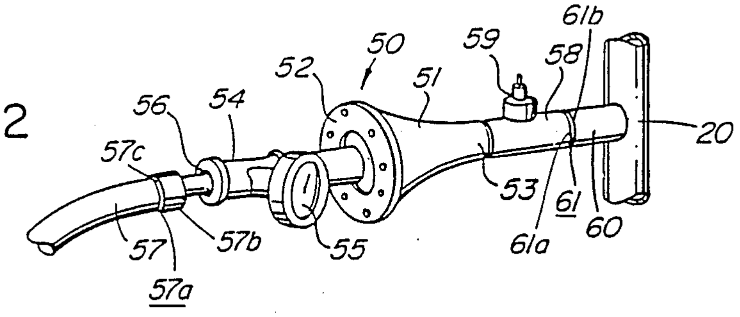
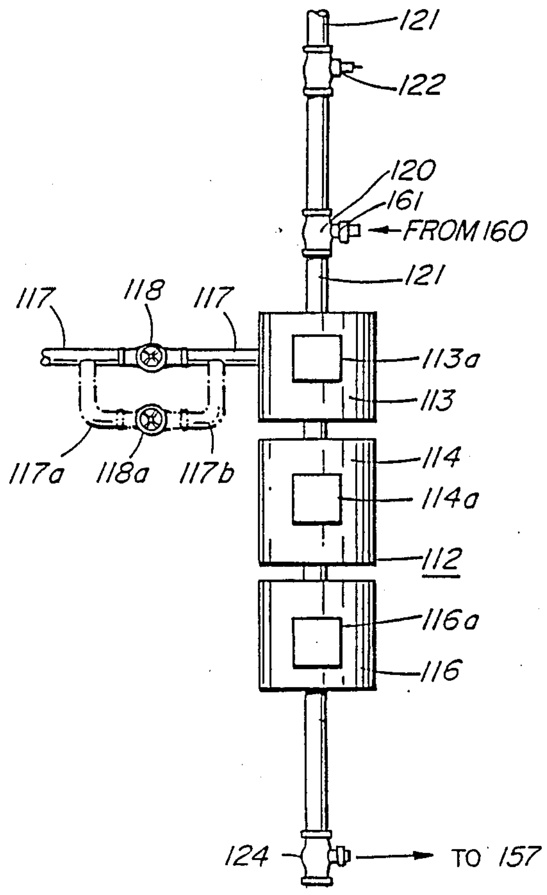
FIG. 3

METHOD AND DEVICE FOR TESTING OF TEMPERATURE CONTROL VALVES IN THE WATER COOLING SYSTEM OF LOCOMOTIVE ENGINES

RELATED APPLICATION

This invention is a continuation-in-part of application Ser. No. 807,759 filed Dec. 11, 1985 now abandoned.

BACKGROUND OF THE INVENTION

1. FIELD OF THE INVENTION

The present invention relates to devices for testing heat sensing units to determine if such units are operating within specified temperature ranges.

2. DESCRIPTION OF THE PRIOR ART

Internal combustion locomotive engines are provided with heated sensing units disposed in the water circulation system for cooling of such engines. Generally a plurality of such thermostats are provided, e.g. four thermostats, to sense temperatures within the cooling system of 170° F., 180° F., 194° F., and 215° F., respectively, and to provide a signal when such respective temperatures are exceeded; or three thermostats to sense temperatures of 170° F., 194° F. and 215° F., respectively. These provide a signal when such respective temperatures are exceeded, and also if there is accidental engine breakdown on the railway line. It is manifest that the accuracy of such thermostats and the true operation thereof is important to prevent damage to the engine.

In the past, such testing of the thermostats has taken place by actual running of the locomotive engines. Since the capacity of the water cooling system is of the order of 200 gallons, such tests required from 1 to 4 hours to complete, depending on ambient temperature. It is clear that this testing means is very wasteful.

Analogous arts have proposed devices for testing of heat detecting devices. For example, U.S. Pat. No. 2,653,470 patented Sept. 29, 1953 by M. Couper provided an apparatus for the testing of conventional radiator valves which included a boiler having an electrical heating unit at the bottom, a pressure indicator at the top and a special construction at the top to hold the radiator valve being tested rigidly in connection with a receiving head and over a funnel. A relief valve is mounted in the upper end of the boiler and electrical connection is provided for the heating element.

U.S. Pat. No. 2,729,095 patented Jan. 3, 1956 by E. M. Greer provided test equipment to test oil temperature regulating valve assemblies. These valve assemblies are disposed in the oil recirculating system of engines and serve to counteract the effect of the circulation of oil which is too hot or too cold. In the past, whether the valves operated correctly at low and high temperatures were simulated by means of test equipment on which the temperature regulating valve unit is mounted. The patented device relied on the use of both oil heating and oil cooling units in an oil reservoir, with a test pad for mounting the valves to be tested in contact with the circulating oil.

U.S. Pat. No. 2,854,844 patented Oct. 7, 1958 by Howell provided a portable probe having a capacity of chamber into which the unit to be tested could be inserted. A heating means was provided in the probe and also a local heat detecting means, whereby the output of the local heat detecting means in the probe could be compared to the indicating equipment permanently wired to the unit under test.

U.S. Pat. No. 3,067,604 patented Dec. 11, 1962 by R. D. Brunson provided an improvement in the aforesaid Howell U.S. Patent by the discovery that selective attenuation of the signal from the heat detecting electrical means in the probe permits use of a given probe with a variety of different designs of units to be tested. Thus, if the signal from the local heat detecting means is attenuated or modified for the distinct unit under test than a correspondence between the local temperature reading and the unit's own reading may be reestablished.

Finally, U.S. Pat. No. 3,347,085 patented Oct. 17, 1967 by S. F. Harris provided apparatus for the testing of thermostat devices particularly those associated with electrical water heaters. The patented device included a container provided both with electrical heating means and insulated housing means for removably receiving the thermostats. It also included a temperature indicating probe control means intermittently energizing the electrical heating means, and indicators were connected to the thermostats to indicate whether the selected thermostat responded to an adjustment of the temperature to a measured preselected temperature.

SUMMARY OF THE INVENTION

(i) Aims of the Invention

These proposed devices all suffered the same deficiency in that they could not test the thermostats in their actual installed environment.

It is, therefore, a primary object of this invention to provide an apparatus for testing thermostats in their actual installed environment.

Another object of the invention is to provide a test device whereby it is not unnecessary either to remove the thermostat or to run the engine to make a test.

Yet another object of this invention is to provide such a device which is wholly portable, simple and inexpensive in its construction and effective and efficient in use.

(ii) Statement of Invention

According to this invention, a portable device is provided for testing a plurality of thermostats in situ, each thermostat being connected to an associated one of heat sensing units which are located within a liquid coolant circulation system of a manifold of a locomotive engine, comprising: (a) a double-open-ended casing fitted with an electric heater, whereby liquid coolant may be heated while such liquid coolant flows through the tubular casing; (b) a first conduit connected to one open outflow end of the tubular casing, the first conduit being provided with a pressure safety valve, the first conduit being connectable to a liquid coolant inflow line leading from a main liquid coolant reservoir by means of a first portion of a first quick-connect coupling for conducting liquid coolant to the manifold; (c) a second conduit connected to a second open inflow end of the tubular casing, the second conduit being provided with a temperature gauge and with a first portion of a second quick-connect coupling; and (d) a hose connected to the second conduit by means of a second portion of the second quick-connect coupling, the hose thereby being connectable to a liquid coolant outflow line for conducting liquid coolant from the manifold; whereby the portable device may be disposed in parallel to a liquid coolant recirculation system connected to the manifold, thereby to provide a recirculating flow of a confined, small amount of electrically-heated liquid coolant between the manifold and the portable device, to test the accuracy and operability of the plurality of thermostats.

This invention also provides the combination of: (A) a manifold of a locomotive engine, the manifold normally being connected to a line for the inflow of liquid coolant from a main liquid coolant reservoir, and being connected to a line for the outflow of liquid coolant to the main liquid reservoir, the manifold being provided with a plurality of heat sensing units disposed within a liquid coolant circulation system, the heat sensing units being connected to an associated one of a plurality of thermostats to be tested, the recirculation system being modified by providing: (i) a first portion of a first quick-connect coupling secured to the line for the inflow of liquid coolant from a main liquid coolant reservoir to the manifold, (ii) a second coupling for connection to means for the circulation of liquid coolant externally of the manifold, and (iii) a solenoid valve in the line for the outflow of liquid coolant from the manifold to the main liquid coolant reservoir; and (B) a portable device for testing the accuracy and operability of a plurality of thermostats, the portable device comprising: (a) a double-open-ended tubular casing fitted with an electric heater, whereby liquid coolant may be heated while such liquid coolant flows through the tubular casing; (b) a first conduit connected to one open outflow end of the tubular casing, the first conduit being provided with a pressure safety valve, the first conduit being connectable to a liquid coolant inflow line from a main coolant reservoir by means of a second portion of the first terminal quick-connect coupling for conducting liquid coolant to the manifold; (c) a second conduit connected to a second open inflow end of the tubular casing, the second conduit being provided with a temperature gauge and with a first portion of a second quick-connect coupling; and (d) a hose connected at one end to the second coupling and at its other end to the second conduit by means of a second portion of the second quick-connect coupling, the hose thereby being connectable to a liquid coolant outflow line for conducting liquid coolant from the manifold; whereby the portable device is so disposed in parallel with a coolant liquid recirculation system connected to the manifold, and thereby provides a recirculating flow of a confined, small amount of electrically-heated liquid coolant between the manifold and the portable device, to test the accuracy and operability of the plurality of thermostats.

This invention also provides a method for testing thermostats in a coolant liquid circulation system of a locomotive engine comprising: (a) confining a portion of liquid coolant from a main liquid coolant liquid reservoir within a cooling manifold of the locomotive engine, the cooling manifold being provided with a plurality of heat sensing units, each connected to an associated one of the plurality of the thermostats to be tested in situ; (b) heating the confined portion of the liquid coolant; and thereby (c) continuously recirculating the heated liquid coolant between the heating means and the cooling manifold, thereby to test the accuracy and operability of the thermostats.

(iii) Other Features of the Invention

By one feature of the device embodiment of the invention, the heater is an internal, through-flow electric heater of 150 W. and 120 V.

By yet another feature of the device embodiment of this invention, the safety pressure valve is a 7 lb. pressure relief valve.

By still another feature of the device embodiment of this invention, the hose is a flexible hose.

By a feature of the device of an embodiment of this invention, the coolant liquid manifold has four thermostats operating at 170° F., 180° F., 194° F. and 215° F., respectively.

By another feature of the device of an embodiment of this invention, coolant liquid manifold has three thermostats, operating at 170° F., 194° F. and 215° F., respectively.

By a further feature of this invention, the combination of the manifold of the locomotive engine and the portable testing device includes a manually-controllable bypass of the solenoid valve.

By other features of the broad method of this application the heating means is an electric heater and the liquid comprises coolant liquid for the coolant liquid system of the locomotive engine.

BRIEF DESCRIPTION OF THE DRAWING

In the accompanying drawings,

FIG. 2 is a side elevational view of the portable thermostat testing device according to one embodiment of this invention; and FIG. 3 is a plan view of a portion of an internal combustion engine provided with three heat sensing units to which is fitted a portable thermostat testing device according to one embodiment of this invention.

DESCRIPTION OF PREFERRED EMBODIMENTS

(i) Description of FIG. 1

Figure 1:
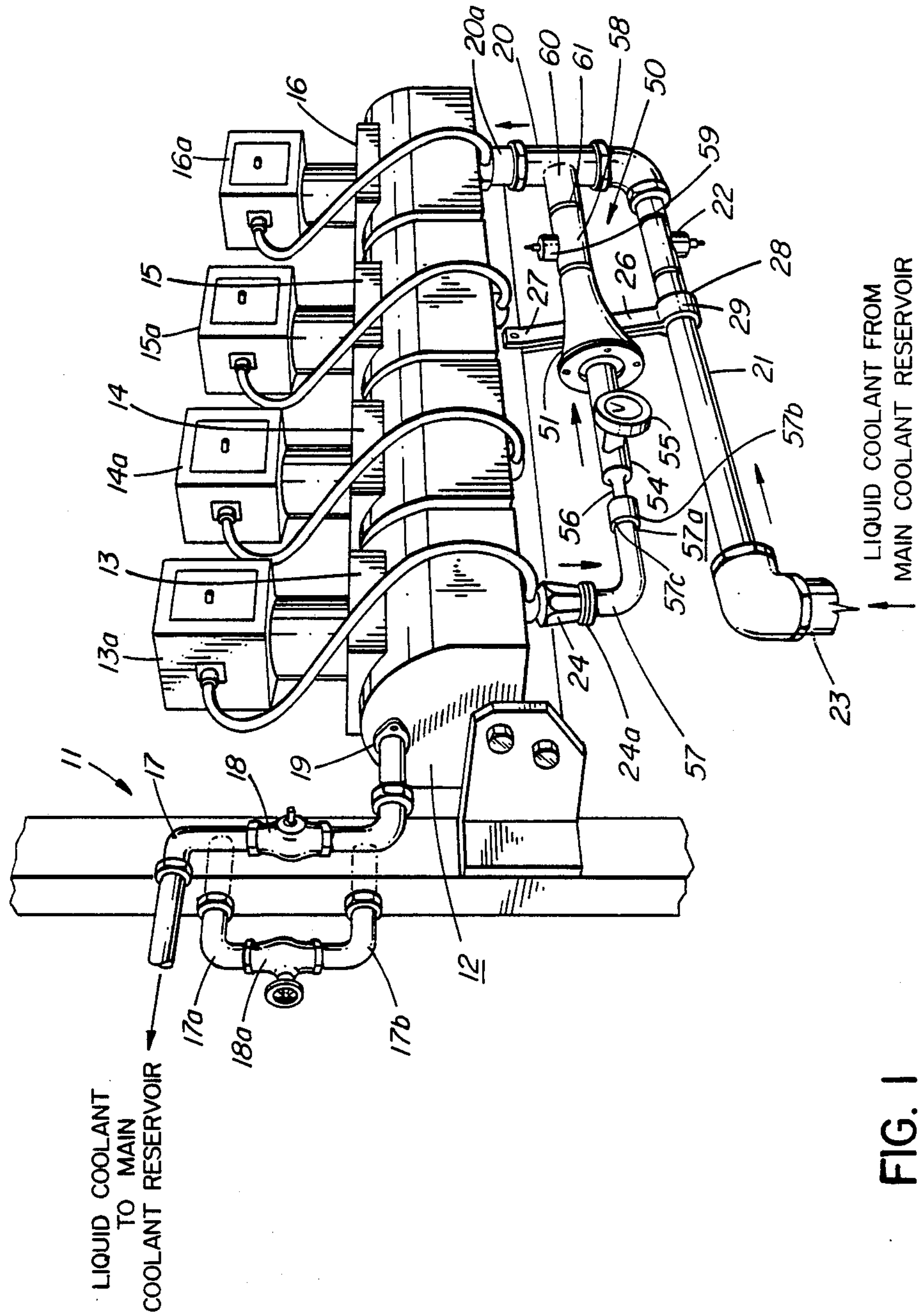
FIG. 1 is a perspective view of a portion of an internal combustion engine provided with four heat sensing units and fitted with a portable thermostat testing device according to one embodiment of this invention.

As seen in FIG. 1, the conventional coolant circulation system of the internal combustion engine includes a frame 11 carrying a cooling manifold 12 provided with a plurality (e.g. four) heat sensing units 13, 14, 15, 16, to sense coolant temperatures of 170° F., 180° F., 194° F., and 215° F., respectively, each being provided with an associated thermostat **13*a*, 14*a*, 15*a*, and 16*a***, respectively.

The liquid coolant would normally circulate from an inlet conduit 23 leading from a main liquid coolant reservoir (not shown) pumped by the engine water pump (also not shown). Coolant would then normally flow to cooling manifold 12 through an inflow connecting line (not now shown) leading to inlet coupling **20*a* and then directly to the cooling manifold 12. Coolant would then flow out through outlet 19 of the cooling manifold 12 to outflow line 17, provided with solenoid valve 18** and then to main coolant reservoir.

Because solenoid valve 18 operates at, e.g. an overpressure of 7 lb., solenoid valve 18 is closed. Hence liquid coolant would remain in cooling manifold 12 until that overpressure is reached. At that overpressure, solenoid valve 18 would open and liquid coolant would flow through to outflow line 17. A manually-controlled bypass is also provided around outflow line 17 and the solenoid valve 18 in the form of lines **17*a*, 17*b*, equipped with a manually-operated valve 18*a*. The purpose of this bypass is to allow throughflow of coolant at normal pressure, without waiting for a 7 lb. overpressure to open solenoid valve 18**.

The thermostat testing device 50 of an embodiment of this invention is shown fitted into the above-described coolant circulation system, which is suitably modified to allow such fitting.

As shown in FIG. 1, the device 50 is fitted to the coolant circulation system in parallel with a new liquid coolant inlet line 21. Because the usual inflow connecting line (previously described) has been removed, inlet conduit 23 now leads to inlet line 21, which is secured to cooling manifold 12 by means of a bracket 26, one end 27 of bracket 26 being connected to the manifold 12, the other end 28 of bracket 26 having rounded jaws 29 to embrace inlet line 21. In order to connect the downstream end of device 50 to line 21, a new inlet line is provided by adding a T-coupling 20 between line 21 and inlet coupling 20*a*. T-coupling 20 is provided with one portion 60 of a first quick-connect coupling 61. In order to connect the upstream end of device 50, one portion 57*b* of second quick-connect coupling 57*a* is provided at the upstream end of device 50, to be connected to second portion 57*c* of the second quick-connect coupling 57*a* which is provided at the outlet end of a hose 57. The inlet end of hose 5 is, in turn, connected to outlet coupling 24, by coupler 24*a*.

(ii) Description of FIG. 2

The upstream or forward end 56 of the "T" coupling unit 54 is fitted, by means of a second portion 57*b* of a second quick-connect coupling 57*a* to the first portion 57*c* of second terminal quick-connect coupling 57*a* which is provided on a flexible hose 57. The inlet end of hose 57 is, in turn, connected to outlet coupling 24 by coupler 24*a* (see FIG. 1). This provides an outlet from the main cooling manifold 12, to provide circulation of the liquid coolant externally of the manifold. (See FIG. 1) T-coupling 54 is also provided with an accurate temperature gauge 55. The casing 51 is fitted with an internal electric heater (not shown) by means of which liquid coolant may be electrically-heated as it passes through the casing 51. The heater may, for example, be a 150 W. 120 V. heater.

The downstream or rearward end 53 of casing 51 is provided with a second "T" fitting 58, provided with a safety valve 59, operating at, e.g. 7 lb. overpressure. The downstream end of the "T" fitting 58 is provided with a second portion 61*a* of the first quick-connect coupling 61 by means of which it is connected to the first portion 61*b* of the first quick-connect coupling 61 and thus to one arm 60 of "T" fitting 20.

(iii) Description of FIG. 3

The embodiment in FIG. 3 is the same as that in FIG. 1, with the same reference numbers being used to designate the same parts, being different only in that they are the "100" series. However, the engine with which the device is to be used is one which has only three thermostats, operating at 170° F., 194° F. and 215° F., respectively. A bypass 117*a*, 117*b* having a manually-controlled valve 118*a* therein is also provided. For the sake of simplicity, the device 50 has not been shown, but the first portion of the first quick-connect coupling (not seen) is connected to the second portion of the quick-connect coupling at arm 161 of T-connector 120, and the first portion of the second quick-connect coupling (not seen) is connected to the second portion of the second quick-connect coupling on tube 157 connected to the outlet coupling (not seen).

Operation of Preferred Embodiments

In operation, referring to the embodiment of FIG. 1, the small amount of coolant liquid within the cooling manifold 12 is confined therein because solenoid valve 18 is closed and because manual valve 18*a* also closed. At this time there is no throughflow of coolant from the main coolant reservoir, through the cooling manifold and back to the main coolant reservoir. This small amount of liquid coolant, e.g. 1–2 gallons, is heated by the heater disposed in casing 51. The temperature rise in the so-heated coolant then causes the coolant to flow through "T"connector 20 to inlet coupling 20*a* and to manifold 12, thereby passing heat-sensing valves 16, 15, 14 and 13. The heating of the coolant by the heater causes the above-described water circulation. Since solenoid valve 18*a* is closed, there is a continued recirculation of approximately 1–2 gallons of continuously-heated coolant liquid. The temperature of the coolant liquid gradually rises, and is displayed by the accurate temperature gauge 55. Testing of the thermostats 13*a*, 14*a*, 15*a* and 16*a* occurs by means of sensing when the thermostats open, correlated to the temperature of the circulating heated coolant liquid displayed at the accurate temperature gauge 55. The recirculation ceases, and the throughflow commences after the temperature testing is completed, either automatically by opening solenoid valve 18 when an overpressure of 7 lbs. is reached (which opens valve 18), or manually by opening manual valve 18*a*.

Conclusion

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly equitably, and "intended" to be, within the full range of equivalence of the following claims.

What I claim is:

1. A portable device for testing a plurality of thermostats in situ, each thermostat being connected to an associated one of heat sensing units which are located within a liquid coolant circulation system of a manifold of a locomotive engine, said portable device comprising:

(a) a double-open-ended tubular casing fitted with an electric heater, whereby liquid coolant may be heated while said liquid coolant flows through said tubular casing;

(b) a first conduit connected to one open outflow end of said tubular casing, said first conduit being provided with a pressure safety valve, said first conduit being connectable to a liquid coolant inflow line leading from a main liquid coolant reservoir by means of one portion of a first quick-connect coupling, said liquid inflow line conducting liquid coolant to said manifold;

(c) a second conduit connected to a second open inflow end of said tubular casing, said second conduit being provided with a temperature gauge and with a second portion of a second quick-connect coupling; and (d) a hose connected at one end to said second conduit by means of a first portion of said second quick-connect coupling, and at its other end to an outflow coupling from said manifold, said hose thereby being connectable to a liquid coolant line for conducting liquid coolant from said manifold;

whereby said portable device may be disposed in parallel with a coolant liquid recirculation system connected to said manifold, thereby to provide a recirculating flow of a confined, small amount of electrically-heated liquid coolant between said manifold and said portable device, thereby to test the accuracy and operability of said plurality of thermostats.

2. The portable device of claim 1 wherein said heater is an internal through-flow electric heater of about 150 W. and about 120 V.

3. The portable device of claim 1 wherein said safety pressure valve is a pressure relief valve of about 7 lb.

4. The portable device of claim 1 wherein said hose is a flexible hose.

5. The combination of:

(A) a cooling manifold of a locomotive engine, said manifold normally being connected to a line for the inflow of liquid coolant from a main liquid coolant reservoir, and being connected to a line for the outflow of liquid coolant to said main liquid reservoir, said manifold being provided with a plurality of heat sensing units disposed within a liquid coolant circulation system, said heat sensing units being connected to an associated one of a plurality of thermostats to be tested, said recirculation system being modified by providing (i) a first portion of a first quick-connect coupling in the line for the inflow of liquid coolant to said manifold, (ii) a coupling for connection to means for the circulation of liquid coolant externally of said manifold, and (iii) a solenoid valve in said line for the outflow of liquid coolant from said manifold to said main liquid coolant reservoir; and (B) a portable device for testing the accuracy and operability of said plurality of thermostats, said portable device comprising: (a) a double-open-ended tubular casing provided with an electric heater, whereby liquid coolant may be heated while such liquid coolant flows through said tubular casing; (b) a first conduit connected to one open outflow end of said tubular casing, said first conduit being provided with a pressure safety valve, said first conduit being connectable to said line for the inflow of liquid coolant from said main coolant reservoir by means of a second portion of said first quick-connect coupling; (c) a second conduit connected to a second open inflow end of said tubular casing, said second conduit being provided with a temperature gauge and with a second portion of a second quick-connect coupling; and (d) a hose connected at one end to said second conduit by means of a first portion of said second quick-connect coupling, and at the other end to said coupling for connection to means for the circulation of liquid coolant externally of said manifold, said hose thereby being connectable to said liquid coolant outflow line for conducting liquid coolant from said manifold;

whereby said portable device is so disposed in parallel with said external coolant liquid recirculation system of said manifold, and thereby provides a recirculating flow of a confined, small amount of electrically-heated liquid coolant between said manifold and said portable device, to test the accuracy and operability of said plurality of thermostats.

6. The portable device of claim 5 wherein said coolant liquid manifold has four thermostats operating at 170° F., 180° F., 194° F. and 215° F. respectively.

7. The portable device of claim 6 wherein said coolant liquid manifold has three thermostats, operating at 170° F., 194° F. and 215° F. respectively.

8. The portable device of claim 5 including: (iv) a manually-controlled valved bypass of said solenoid valve.

9. A method for testing thermostats in a coolant liquid circulation system of a locomotive engine, said method comprising:

(a) confining a portion of liquid coolant from a main liquid coolant reservoir to a cooling manifold of said locomotive engine, said cooling manifold being provided with a plurality of heat sensing units each connected to an associated one of said plurality of thermostats to be tested in situ;

(b) heating said confined portion of said liquid coolant; and thereby (c) continuously recirculating said portion of said heated liquid coolant between said heating means and said cooling manifold;

thereby to test the accuracy and operability of said thermostats.

10. The method of claim 9 wherein said heating means comprises an electric heater.

11. The method of claim 9 wherein said liquid comprises coolant liquid for the coolant liquid system of said locomotive engine.

* * * * *